(12) United States Patent
Fan

(10) Patent No.: US 9,863,552 B2
(45) Date of Patent: Jan. 9, 2018

(54) FLUID VALVE AND A SINGLE SHAFT-SEALING MODULE THEREOF

(71) Applicant: JDV CONTROL VALVES CO., LTD, Yangmei, Taoyuan County (TW)

(72) Inventor: Andy Fan, Yangmei, Taoyuan County (TW)

(73) Assignee: JDV Control Valves Co., Ltd., Yangmei, Taoyuan County (TW)

( * ) Notice: Subject to any disclaimer, the term of this patent is extended or adjusted under 35 U.S.C. 154(b) by 0 days.

(21) Appl. No.: 15/245,764

(22) Filed: Aug. 24, 2016

(65) Prior Publication Data

US 2016/0363237 A1 Dec. 15, 2016

Related U.S. Application Data

(63) Continuation-in-part of application No. 14/540,738, filed on Nov. 13, 2014, now abandoned, which is a
(Continued)

(30) Foreign Application Priority Data

Jun. 24, 2014 (TW) .............................. 103121659 A
Jun. 24, 2014 (TW) .............................. 103121660 A

(51) Int. Cl.
*F16K 1/00* (2006.01)
*F16K 41/02* (2006.01)
(Continued)

(52) U.S. Cl.
CPC ............ *F16K 41/026* (2013.01); *F16K 1/226* (2013.01); *F16K 5/0663* (2013.01); *F16K 31/44* (2013.01);
(Continued)

(58) Field of Classification Search
CPC ........... Y10T 137/598; Y10T 137/6055; Y10T 137/6065; Y10T 137/6069;
(Continued)

(56) References Cited

U.S. PATENT DOCUMENTS 534,575 A 2/1895 Platts et al.
2,749,082 A 6/1956 Alllen
(Continued)

FOREIGN PATENT DOCUMENTS

CN 102313074 A 1/2012
CN 203656355 U 6/2014
(Continued)

OTHER PUBLICATIONS

TW Office Action dated Dec. 21, 2015 from corresponding TW Appl No. 103121660, 6 pp.
(Continued)

*Primary Examiner* — Craig J Price
(74) *Attorney, Agent, or Firm* — Muncy, Geissler, Olds & Lowe, P.C.

(57) ABSTRACT

A fluid valve with a single shaft-sealing module is disclosed. The single shaft-sealing module allows the annular shaft sealing rings to be squeezed to slightly deform to prevent gaps being formed between the shaft and the inner surface of the valve body, and facilitates easy clean and/or replacement of the worn shaft sealing rings.

20 Claims, 13 Drawing Sheets

Related U.S. Application Data continuation-in-part of application No. 14/542,107, filed on Nov. 14, 2014, now abandoned.

(51) Int. Cl.
| | | |
|---|---|---|
| *F16K 5/06* | (2006.01) | |
| *F16K 1/226* | (2006.01) | |
| *F16K 31/44* | (2006.01) | |

(52) U.S. Cl.
CPC ......... *F16K 41/02* (2013.01); *Y10T 137/5392* (2015.04); *Y10T 137/5397* (2015.04); *Y10T 137/7036* (2015.04); *Y10T 137/87523* (2015.04); *Y10T 137/87531* (2015.04)

(58) Field of Classification Search
CPC ......... Y10T 137/5392; Y10T 137/5397; Y10T 137/7036; Y10T 137/87523; Y10T 137/87531; F16K 41/02; F16K 43/00; F16K 31/44; F16K 5/0663; F16K 1/226; F16K 41/026; F16J 15/32; B25B 27/0028; F16C 17/022
USPC ......... 137/283, 284, 315.01, 315.24, 315.27, 137/315.28, 375, 601.16, 601.17; 251/241, 306–308, 330; 277/510, 511, 277/519, 520, 521, 522, 308, 371, 375; 166/84.1
See application file for complete search history.

(56) References Cited

U.S. PATENT DOCUMENTS

| | | | |
|---|---|---|---|
| 3,006,598 | A | 10/1961 | Carr |
| 3,379,405 | A | 4/1968 | Natho |
| 3,586,341 | A | 6/1971 | Whittaker et al. |
| 3,778,028 | A | 12/1973 | Graves |
| 4,162,782 | A | 7/1979 | Wilkins |
| 4,270,730 | A | 6/1981 | Hinrichs |
| 4,289,317 | A | 9/1981 | Kuc |
| 4,444,220 | A | 4/1984 | Seger |
| 4,468,039 | A | 8/1984 | Le |
| 4,516,752 | A | 5/1985 | Babbitt et al. |
| 4,538,790 | A | 9/1985 | Williams et al. |
| 4,556,196 | A | 12/1985 | Nimberger |
| 4,570,942 | A | 2/1986 | Diehl et al. |
| 4,601,304 | A | 7/1986 | Schobl |
| 4,617,957 | A | 10/1986 | Sandling |
| 4,630,636 | A | 12/1986 | Cutcher |
| 4,640,305 | A | 2/1987 | Johnson |
| 4,773,442 | A | 9/1988 | Lephilibert |
| 5,024,453 | A | 6/1991 | Suggs |
| 5,056,758 | A | 10/1991 | Bramblet |
| 5,056,759 | A | 10/1991 | Schlesch |
| 5,238,252 | A | 8/1993 | Stewen et al. |
| 5,290,010 | A | 3/1994 | Ridge |
| 5,299,812 | A | 4/1994 | Brestel et al. |
| 5,356,157 | A | 10/1994 | Houston |
| 5,435,520 | A | 7/1995 | Vyvial |
| 5,454,547 | A | 10/1995 | Brown |
| 5,577,709 | A | 11/1996 | Gugala et al. |
| 5,593,166 | A | 1/1997 | Lovell et al. |
| 5,607,165 | A | 3/1997 | Bredemeyer |
| 5,636,688 | A | 6/1997 | Bassinger |
| 5,732,731 | A | 3/1998 | Wafer |
| 5,743,288 | A | 4/1998 | Mosman et al. |
| 5,908,046 | A | 6/1999 | Mosman |
| 6,000,469 | A | 12/1999 | Bassinger |
| 6,167,959 | B1 | 1/2001 | Bassinger et al. |
| 6,168,161 | B1 | 1/2001 | Majcen |
| 6,247,679 | B1 | 6/2001 | Robert |
| 6,412,783 | B1 | 7/2002 | Finnestad |
| 6,673,201 | B2 | 1/2004 | Vogel |
| 6,739,390 | B1 | 5/2004 | Kimberley |
| 7,284,602 | B2 | 10/2007 | Tessier et al. |
| 7,861,771 | B2 | 1/2011 | McCreedy et al. |
| 8,051,874 | B2 | 11/2011 | McCarty |
| 8,613,423 | B2 | 12/2013 | Hutchens et al. |
| 8,622,367 | B2 | 1/2014 | Lovell |
| 8,863,768 | B2 | 10/2014 | Kang |
| 2001/0020771 | A1 | 9/2001 | Nishikawa |
| 2002/0158221 | A1 | 10/2002 | Sterud |
| 2004/0099835 | A1 | 5/2004 | Hallett |
| 2005/0082766 | A1 | 4/2005 | Lovell et al. |
| 2005/0200081 | A1 | 9/2005 | Stanton |
| 2006/0197048 | A1 | 9/2006 | Varriale |
| 2009/0211750 | A1 | 8/2009 | Toporowski et al. |
| 2012/0301061 | A1 | 11/2012 | Forrest |
| 2013/0270472 | A1 | 10/2013 | Crochet, Sr. et al. |
| 2015/0369389 | A1 | 12/2015 | Fan |

FOREIGN PATENT DOCUMENTS

| | | |
|---|---|---|
| DE | 24 12 698 A1 | 9/1975 |
| TW | M453066 U | 5/2013 |

OTHER PUBLICATIONS

DE Office Action dated Jun. 10, 2015 from corresponding DE Appl No. 10 2014 113 510.5, 10 pp.

FLUID VALVE AND A SINGLE SHAFT-SEALING MODULE THEREOF

CROSS-REFERENCE TO RELATED APPLICATIONS

The present application is a continuation-in-part application claiming the benefit of U.S. non-provisional application Ser. No. 14/540,738, filed on Nov. 13, 2014, which claims the benefit of TW patent application Ser. No. 103121659, filed on Jun. 24, 2014, and the benefit of U.S. non-provisional application Ser. No. 14/542,107, filed on Nov. 14, 2014, which claims the benefit of TW patent application Ser. No. 103121660, filed on Jun. 24, 2014, and all of which are incorporated herein by reference in their entireties.

TECHNICAL FIELD

The present disclosure relates to a fluid valve, and more particularly to a fluid valve having a single shaft-sealing module.

BACKGROUND

A typical fluid valve provided on a fluid channel, as schematically shown in FIG. 1A, includes a valve body 92, a stem/shaft 94 and a valve disc (not shown) installed inside the valve body 92 and below the stem/shaft 94. The typical fluid valve is controlled to be opened or closed by moving, usually by rotating, the stem/shaft 94 and therefore synchronize the motion of the valve disc (not shown).

The industrial application of the typical fluid valve requires the valve body 92 and the stem/shaft 94 to be resistant to high-temperature and/or corrosive fluids, and therefore requires them to be made of heat-resistant and/or indissoluble materials, such as metals. However, the metal-made valve body 92 and the stem/shaft 94 are easy to form gaps there between when they become worn after mutual friction for a period of time and/or when they are subjected to huge temperature variation, and which easily cause particles to enter the gaps to stick the stem/shaft 94 in the valve body 92. Accordingly, a fluid valve might be improved to be formed with a shaft seal groove 922 between the stem/shaft 94 and the valve body 92, and disposed with several stacked annular shaft seal rings 96 in the shaft seal groove 922, such that the stacked shaft seal rings 96 support and avoid stuck of the stem/shaft 94. It is well known that the stacked shaft seal rings 96 are often made of materials with lower rigidity and smaller thermal expansion coefficients, such as graphite or polytetrafluoroethene (PTFE). Therefore, the above-mentioned problems of forming gaps between the shaft 94 and the valve body 92 due to continuous wear and/or drastic heat expansion and contraction may be reduced.

However, referring to FIG. 1B, the improved fluid valve still has a problem of having unbalanced lateral loading distribution 8 along the axial direction of the stacked shaft seal rings 96, wherein an upper portion of the stacked shaft seal rings 96 is subjected to a larger lateral loading than that to which a lower portion is subjected. Such result could badly affect the sealing effect of the stacked shaft sealing rings. An ideal lateral loading distribution should be that the upmost and lowest portions of the stacked shaft sealing rings are subjected to identical or similar loadings and the loadings gradually decrease towards the center portion. Other improved fluid valves are provided with disc springs and/or coil springs in the shaft sealing structure to balance the lateral loadings. However, the shape of the disc springs subjects the inner ring and the outer ring thereof to unequal axial loadings and could not effectively solve the issue of unbalanced lateral loadings. Although could be used to bear evenly distributed loadings, the coil springs occupy too much space in a shaft sealing structure.

On the other hand, the shaft seal rings 96 could still become worn after a long period of time of usage and/or corroded by corrosive fluid, and gaps may be formed between the shaft 94 and the valve body 92 and cause the fluid to leak. Accordingly, there is a need to periodically clean and/or replace the damaged shaft seal rings 96 within the shaft seal groove 922 to maintain the normal operation of the fluid valve. However, as shown in FIG. 1A, the shaft seal groove 922 is typically a very restricted space that is difficult for technicians to take one of the stacked shaft seal rings 96 and perform the clean and/or the replacement. The time consumed in the clean and/or the replacement of the stacked shaft seal rings 96 not only increases the labor cost but may also cause the production line to shut down when the fluid valves are not available.

In view of the above, there is a need to provide a single shaft-sealing module that contributes ideal lateral and axial loading distribution on the shaft-sealing components disposed inside the single shaft-sealing module, provides convenient cleaning and replacement operation, as well as has small space occupation.

SUMMARY

In order to solve the abovementioned problem, the present disclosure provides a fluid valve with a single shaft-sealing module allowing the annular shaft sealing rings to be squeezed to slightly deform to prevent gaps being formed between the shaft and the inner surface of the valve body, and facilitating easy clean and/or replacement of the worn shaft sealing rings.

In one embodiment, the present disclosure provides a fluid valve including a valve body, a shaft, and a valve disc, the valve body having a first hollow space to accommodate the shaft and a second hollow space to accommodate the valve disc, the second hollow space being located below the first hollow space and in communication with the first hollow space, the shaft vertically penetrating the valve disc to drive the valve disc to rotate, wherein the fluid valve further includes a single shaft-sealing module entirely disposed inside the first hollow space to surround the shaft.

The single shaft-sealing module may include a carrier being a first columnar body formed with a third hollow space between an inner wall of the first columnar body, and one opening at a topmost end of the first columnar body, and one opening at a bottommost end of the first columnar body, the inner wall of the first columnar body being formed with a first annular protruding portion at the bottommost end of the first columnar body, the carrier being detachable with respect to the valve body and entirely disposed inside the first hollow space to surround the shaft; a bushing being a second columnar body formed with a second annular protruding portion at a topmost end of an outer side surface of the second columnar body, disposed inside the third hollow space of the carrier at the bottom with the second annular protruding portion being seated on the first annular protruding portion, a bottommost end of the second columnar body extending beyond the bottommost end of the carrier; a plurality of first annular shaft seal rings being non-metal and seated on the topmost end of the second columnar body of the bushing to seal the shaft; a first annular shaft ring being metallic and seated on the plurality of first annular shaft seal rings; a first annular wave spring being metallic and seated on the first annular shaft ring; a second annular shaft ring being metallic and seated on the first annular wave spring; and a plurality of second annular shaft seal rings being non-metal and seated on the second annular shaft ring.

The first hollow space may be columnar and gradually narrowed from a topmost end of the first hollow space; the topmost end of the first columnar body of the carrier may be beneath the topmost end of the first hollow space; the first annular wave spring may be formed with a continuously wave-shaped contour and a plurality of convex portions and a plurality of concave portions on the same plane in an offset manner, the convex portions and the concave portions have same number in quantity, and the convex portions contact a bottommost surface of the second annular shaft ring while the concave portions contact a topmost surface of the first annular shaft ring; all of the bushing, the plurality of first annular shaft seal rings, the first annular shaft ring, the first annular wave spring, the second annular shaft ring, and the plurality of second annular shaft seal rings together surround a space to accommodate the shaft; at least the plurality of first annular shaft seal rings and the plurality of second annular shaft seal rings provide sealing between the shaft and the inner wall of the first columnar body of the carrier; and a lateral loading on a topmost end of the plurality of first annular shaft seal rings and a lateral loading on the bottommost end of the plurality of second annular shaft seal rings may be substantially equal.

In another embodiment, the fluid valve may further include an annular cap disposed on top of the single shaft-sealing module to cover the topmost end opening of the carrier to restrict the bushing, the plurality of first annular shaft seal rings, the first annular shaft ring, the first annular wave spring, the second annular shaft ring, and the plurality of second annular shaft seal rings inside the carrier, and the shaft penetrates the annular cap.

In another embodiment, the fluid valve may further include two sets of springs disposed on top of the annular cap in an axially symmetrical manner. The two sets of springs may be of disc-shaped washer type.

In another embodiment, one of the first annular shaft ring and the second annular shaft ring may provide sealing between the shaft and the inner wall of the first columnar body of the carrier.

In another embodiment, an inner surface of one of the first annular shaft ring and the second annular shaft ring may be formed with a first annular groove, and an outer surface of one of the first annular shaft ring and the second annular shaft ring may be formed with a second annular groove, and the first annular groove and the second annular groove each may be embedded with an O-ring.

In another embodiment, one of the first annular shaft ring and the second annular shaft ring may be formed with a protrusion at a central part of a bottommost end and two shoulders at two side edges of a bottommost end, respectively.

In another embodiment, the carrier may have an L shape cross section.

In another embodiment, the bushing and the carrier may be one-piece mad of metallic materials.

In another embodiment, an inner surface of the valve body surrounding the first hollow space may be formed with a plurality of shoulders to fit a shape of the single shaft-sealing module, and at least one of the plurality of shoulders near a region where the second hollow space in communication with the first hollow space may be provided with a seal ring to avoid fluid leakage between the single shaft-sealing module and the valve body.

In another embodiment, the convex portions and the concave portions may be four to eight in number.

In another embodiment, the plurality of first annular shaft seal rings, the first annular shaft ring, the first annular wave spring, the second annular shaft ring, and the plurality of second annular shaft seal ring may have same inner diameter.

In another embodiment, a ratio of height of the bushing to height of all the plurality of first annular shaft seal rings, the first annular shaft ring, the first annular wave spring, the second annular shaft ring, and the plurality of second annular shaft seal rings may range from 1:2.5 to 1:3.5.

In another embodiment, a ratio of the height of the bushing to a height of the carrier may range from 1:3 to 1:4.

In another embodiment, the fluid valve may be a globe valve, a ball valve, or a butterfly valve.

In another embodiment, the first annular shaft seal rings and the second annular shaft seal rings may be made of soft non-metal materials while the first annular shaft ring, the second annular shaft ring, and the first annular spring may be made of metal. The soft non-metal materials may include graphite and PTFE.

In another embodiment, the first annular shaft ring and the second annular shaft ring may be made of stainless steel, and the first annular spring may be made of alloy.

In another embodiment, the first annular shaft ring and the second annular shaft ring may be made of SAE 304 stainless steel.

In another embodiment, the first annular spring may be made of INCONEL alloy, which is known as a nickel-chromium-based alloy.

In the present disclosure, all of the plurality of first annular shaft seal rings, the first annular shaft ring, the first annular spring, the second annular shaft ring, and the plurality of second annular shaft seal rings sequentially stacked on the bushing could be taken out in just a single operation at the same time when the carrier is removed out of the seal groove. As a result, it would be very convenient for technicians to perform clean and/or replacement of the shaft seal rings and maintain the normal operation of the fluid valve.

The present disclosed fluid valve also utilizes the additionally provided first annular spring and annular shaft rings to uniformly distribute the lateral and axial loadings on the annular shaft seal rings that are respectively disposed on top and below bottom of the first annular spring and the annular shaft rings. When the annular shaft sealing rings are worn after being used for a period of time, the first annular spring and the annular shaft rings together contribute enough supporting forces in the vertical direction to squeeze the annular shaft sealing rings to slightly deform to prevent gaps being formed between the shaft and the inner surface of the carrier. Therefore, gaps will not be prone to occur between the shaft and the valve body, and leakage of fluid from the gaps could be effectively prevented. Moreover, the effect of balancing the lateral loadings on the annular shaft sealing rings made of soft non-metal materials could be achieved.

BRIEF DESCRIPTION OF DRAWINGS

The following detailed descriptions, given with examples, are not intended to limit the present disclosure solely thereto, and will be best understood in conjunction with the accompanying figures.

DETAILED DESCRIPTION OF THE EMBODIMENTS

The following description and the accompanying schematically plotted drawings of the present disclosure are used to illustrate the main technical features of the present disclosure. The other features which belong to the operational principles or which will be understood by those skilled in the art will not be illustrated in detail.

Figure 2A:
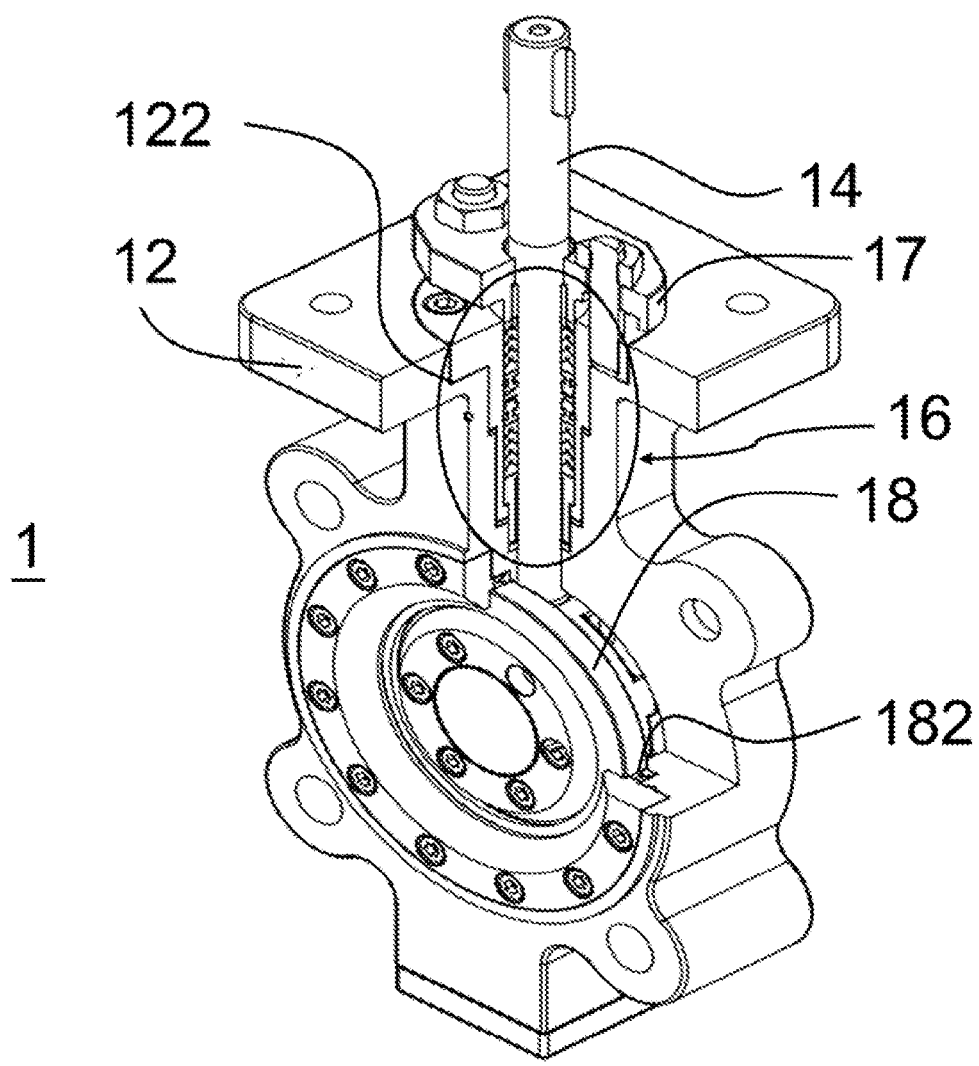
FIG. 2A is a perspective view schematically illustrating a fluid valve with a single shaft-sealing module in accordance with a first embodiment of the present disclosure.

Referring to FIG. 2A, a fluid valve 1 according to a first embodiment of the present disclosure includes a valve body 12, a shaft 14, a single shaft-sealing module 16, and a valve disc 18. The shaft 14 and the valve disc 18 are installed inside the valve body 12 and connected to each other. The fluid valve 1 is disposed on a fluid channel (not shown) in a manner that the valve disc 18 is positioned to face the cross section of the fluid channel. The valve disc 18 is driven by the shaft 14 and therefore to rotate to control the opening and closure of the fluid channel.

Figure 2B:
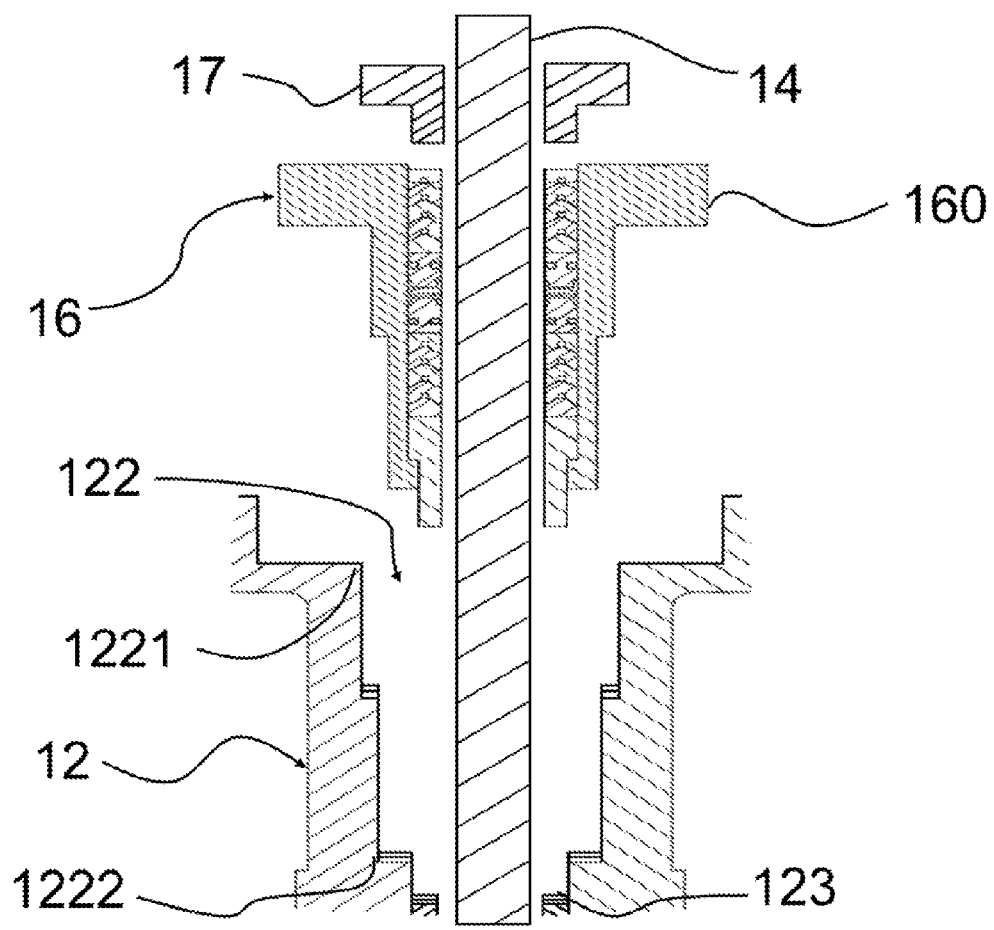
FIG. 2B is a partially enlarged cross-sectional view schematically illustrating the shaft sealing structure as circled of the fluid valve in FIG. 2A in accordance with the first embodiment of the present disclosure.

Referring to FIG. 2A and FIG. 2B, the shaft sealing structure as circled of the fluid valve in FIG. 2A is enlarged in FIG. 2B. As shown in FIG. 2A and FIG. 2B, the valve body 12 is formed with a shaft seal groove 122 in an upper portion and a valve disc groove 182 in a lower portion. The shaft seal groove 122 and the valve disc groove 182 are two hollow spaces in communication with each other, and the valve disc groove 182 is located just below the shaft seal groove 122. The single shaft-sealing module 16 is entirely disposed inside the shaft seal groove 122 of the valve body 12 to surround and support the shaft 14, while the valve disc 18 is entirely disposed inside the valve disc groove 182 of the valve body 12 with the shaft 14 vertically penetrating the valve disc 18. More details of the single shaft-sealing module 16 will be described below. Herein, the single shaft-sealing module 16 is entirely disposed inside the shaft seal groove 122 of the valve body 12 such that a topmost surface of the single shaft-sealing module 16 is beneath a topmost end of the shaft seal groove 122 when assembly of the single shaft-sealing module 16 is completed.

As shown in FIG. 2B, the shaft seal groove 122 is a columnar hollow space extending downward from the topmost end of the shaft seal groove 122 to a region where the valve disc groove 182 connects the shaft seal groove 122 and where the valve disc 18 is located. The valve disc groove 182 is a vertically annular how space. Obviously, the shaft seal groove 122 is gradually narrowed from the topmost end of the shaft seal groove 122 and an inner surface of the valve body 12 surrounding the shaft seal groove 122 is formed with a plurality of upper shoulders 1221 and a plurality of lower shoulders 1222 at the junction where the diameter changes to fit the shape of the single shaft-sealing module 16. In one embodiment, at least the lowest one of the lower shoulders 1222 near the region where the valve disc groove 182 connects the shaft seal groove 122 is provided with a seal ring 123 to avoid fluid leakage between the single shaft-sealing module 16 and the valve body 12. In other embodiments, all the lower shoulders 1222 may each be provided with the seal ring 123.

Figure 2C:
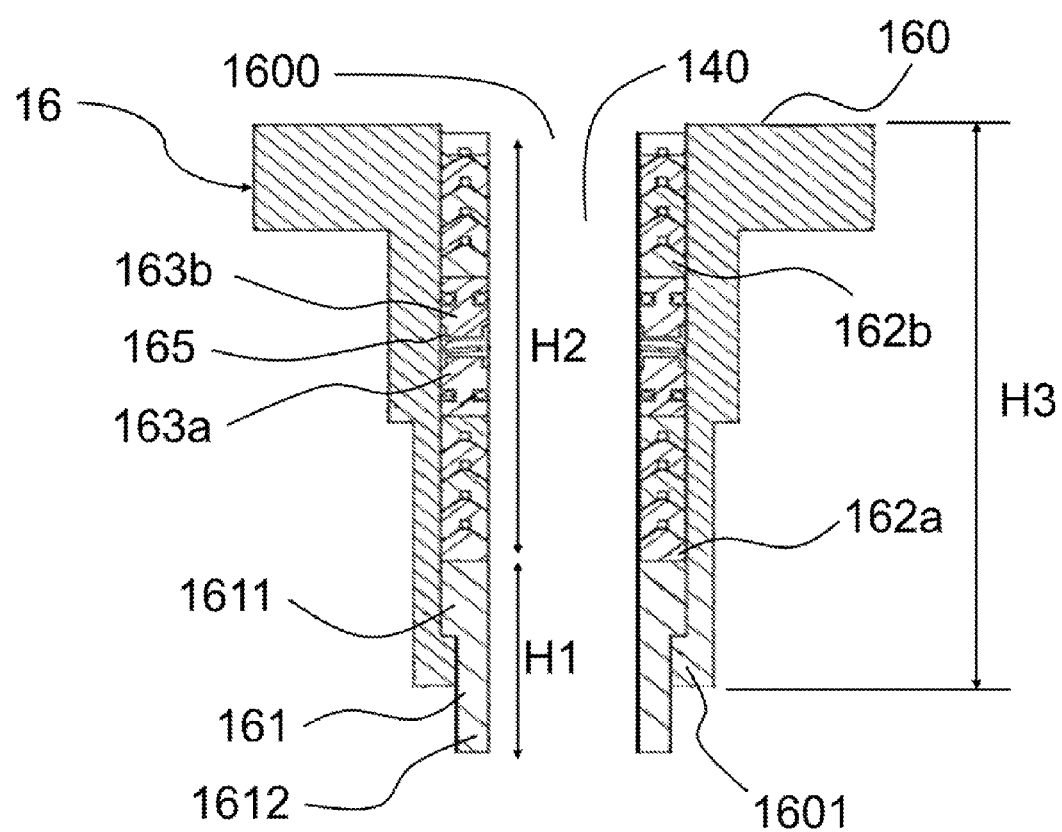
FIG. 2C is a partially enlarged cross-sectional view schematically illustrating the single shaft-sealing module to be inserted inside the valve body in FIG. 2B in accordance with the first embodiment of the present disclosure.

As shown in FIG. 2C, the single shaft-sealing module 16, which may be considered as a structural combination, includes at least a carrier 160, a bushing 161, a plurality of first annular shaft seal rings 162a, and a first annular shaft rings 163a. In one embodiment, a plurality of second annular shaft seal rings 162b and a second annular shaft ring 163b and a first annular spring 165 may be further provided. The plurality of first annular shaft seal rings 162a, the first annular shaft ring 163a, the first annular spring 165, the second annular shaft ring 163b, and the plurality of second annular shaft seal rings 162b are sequentially stacked on the bushing 161 inside the carrier 160 to form a longitudinally-symmetrical shaft sealing structure with respect to the shaft 14. At least the inner surfaces of the plurality of first annular shaft seal rings 162a and the plurality of second annular shaft seal rings 162b functions to touch an external side surface of the shaft 14 to seal the shaft 14. In one embodiment, the first annular shaft seal rings 162a and the second annular shaft seal rings 162b are made of soft non-metal materials such as graphite and/or polytetrafluoroethene (PTFE), while the first annular shaft ring 163a and the second annular shaft ring 163b are made of metallic materials such as SAE 304 stainless steel, and the first annular spring 165 is a wave spring made of metal and/or alloy such as INCONEL alloy.

The carrier 160 is a columnar body having an L shape cross section, a hollow space 1600 between an inner wall of the columnar body, and one opening at a topmost end, and one opening at a bottommost end. The inner wall of the columnar body is formed with a first annular protruding portion 1601 at the bottommost end. The bushing 161 is a hollow columnar body and an external side surface of the bushing 161 is formed with a second annular protruding portion 1611 at a topmost end of the hollow columnar body of the bushing 161. The bushing 161 is disposed inside the hollow space 1600 at the bottom with the second annular protruding portion 1611 being seated on the first annular protruding portion 1601, and with a bottommost end 1612 of the hollow columnar body of the bushing 161 being extending beyond the bottommost end of the carrier 160. As shown in FIGS. 2A and 2B, when the single shaft-sealing module 16 is installed entirely inside the shaft seal groove 122, the carrier 160 is entirely disposed in the shaft seal groove 122 such that the topmost end of the columnar body of the carrier 160 is beneath the top end of the shaft seal groove 122 after the carrier 160 being fixed in position, the carrier 160 has its bottommost end abut against one of the seal rings 123 at one of the lower shoulders 1222 near the region where the valve disc groove 182 connects the shaft seal groove 122, and the bottommost end 1612 of the bushing 161 abuts against the seal ring 123 at the lowest one of the lower shoulders 1222 near the region where the valve disc groove 182 connects the shaft seal groove 122. In one embodiment, the bushing 161 and the carrier 160 may be formed integrally to become one-piece, and the bushing 161 and the carrier 160 are made of metallic materials.

As shown in FIG. 2C, the plurality of first annular shaft seal rings 162a, the first annular shaft ring 163a, the first annular spring 165, the second annular shaft ring 163b, and the plurality of second annular shaft seal rings 162b are sequentially stacked on the bushing 161 inside the hollow space 1600. In one embodiment, the plurality of first annular shaft seal rings 162a, the first annular shaft ring 163a, the first annular spring 165, the second annular shaft ring 163b, and the plurality of second annular shaft seal rings 162b each may have the same inner diameter as the inner diameter of the bushing 61. Because the bushing 161 is firmly seated on the carrier 160, all of the plurality of first annular shaft seal rings 162a, the first annular shaft ring 163a, the first annular spring 165, the second annular shaft ring 163b, and the plurality of second annular shaft seal rings 162b could be sequentially stacked and seated on a topmost end of the bushing 161 without falling down. In other words, all of the plurality of first annular shaft seal rings 162a, the first annular shaft ring 163a, the first annular spring 165, the second annular shaft ring 163b, and the plurality of second annular shaft seal rings 162b sequentially stacked on the bushing 161 could be taken out in just a single operation of taking the carrier 160 out of the shaft seal groove 122. In one embodiment, the ratio of the height H1 of the bushing 161 to the height H2 of all the plurality of first annular shaft seal rings 162a, the first annular shaft ring 163a, the first annular spring 165, the second annular shaft ring 163b, and the plurality of second annular shaft seal rings 162b ranges from 1:2.5 to 1:3.5, and the ratio of the height H1 of the bushing 161 to the height H3 of the carrier 160 ranges from 1:3 to 1:4.

Figure 2D:
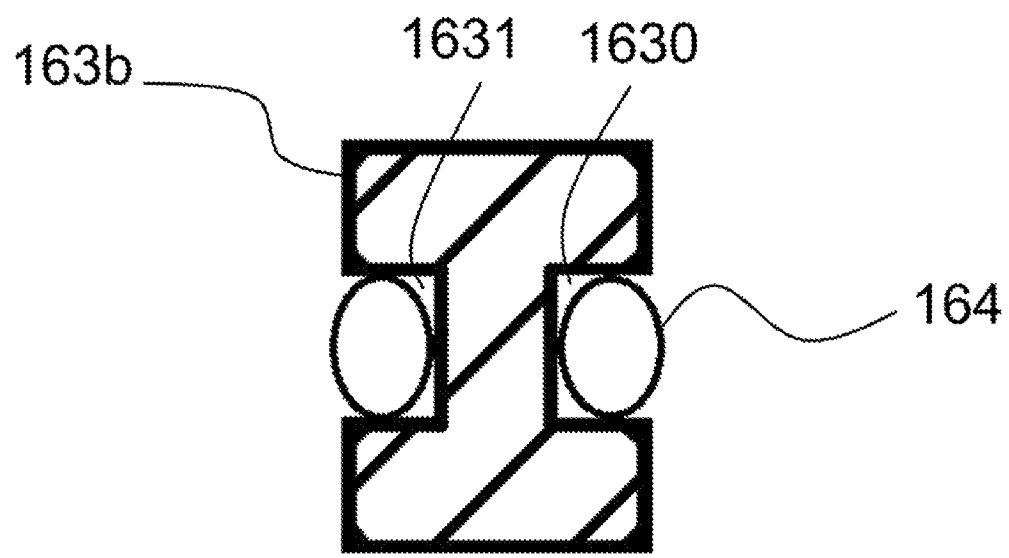
FIG. 2D is a partially enlarged cross-sectional view schematically illustrating a groove-type shaft ring of the single shaft-sealing module in FIG. 2C in accordance with the first embodiment of the present disclosure.

As shown in FIG. 2D, the first annular shaft ring 163a and the second annular shaft ring 163b themselves are not sealing components. The first annular shaft ring 163a and the second annular shaft ring 163b are made of materials with higher rigidity than that of the plurality of first annular shaft seal rings 162a and the plurality of second annular shaft seal rings 162b to resist against forces applied on top and below bottom of them. The first annular shaft ring 163a and the second annular shaft ring 163b each may be formed with a first annular groove 1630 and a second annular groove 1631 on an inner surface and an outer surface, respectively, to form a letter I-shaped cross section such that the first shaft ring 163a and the second shaft ring 163b are not prone to deformation. The first annular groove 1630 and the second annular groove 1631 each may be further embedded with an O-ring 164 to provide tight sealing engagement with an outer surface of the shaft 140 and the inner wall of the columnar body of the carrier 160, respectively. As a result, the first annular shaft ring 163a and the second annular shaft ring 163b do not easily deform and could uniformly distribute the forces thereon when the axial forces come from the plurality of first annular shaft seal rings 162a, the plurality of second annular shaft seal rings 162b, and the first annular spring 165 apply on them.

Figure 2E:
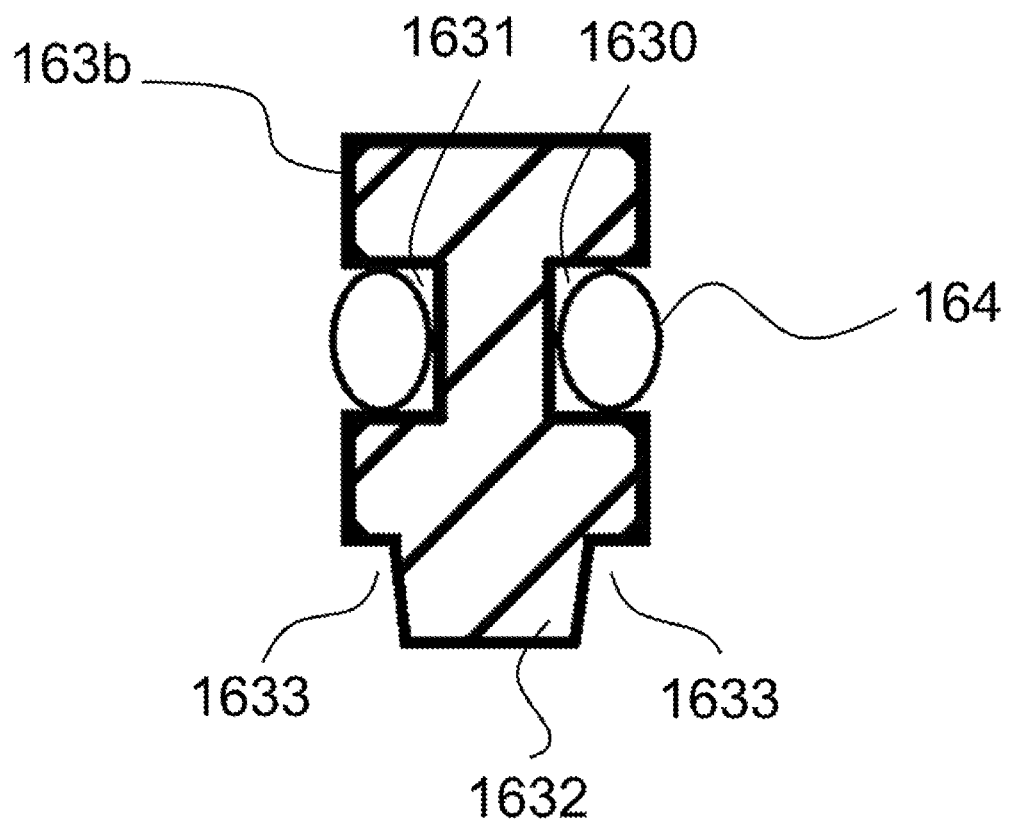
FIG. 2E is a partially enlarged cross-sectional view schematically illustrating another groove-type shaft ring of the single shaft-sealing module in FIG. 2C in accordance with an another embodiment of the present disclosure.

In another embodiment, referring to FIG. 2E, the second annular shaft ring 163b may alternatively be formed with a downward facing protrusion 1632 at the central part of a bottommost end and two downward facing shoulders 1633 at two side edges of the bottommost end, respectively. Similarly, the first annular shaft ring 163a may be formed to have the same structure with an upward facing protrusion and two upward facing shoulders. When the first annular shaft ring 163a and the second annular shaft ring 163b formed with the protrusion 1632 and the shoulders 1633 are stacked with the first annular spring 165, two spaces respectively formed between the downward facing shoulders 1633 of the second annular shaft rings 163b and a topmost surface of the first annular spring 165, while two spaces respectively formed between the upward facing shoulders of the first annular shaft rings 163a and a bottommost surface of the first annular spring 165. These spaces may be filled with sealing materials to enhance the sealing effectiveness of the first annular shaft ring 163a, the second annular shaft ring 163b, and the first annular spring 165.

Referring to FIG. 2C, the bushing 61, the plurality of first annular shaft seal rings 162a, the first annular shaft ring 163a, the first annular spring 165, the second annular shaft ring 163b, and the plurality of second annular shaft seal rings 162b together surround a space 140 for accommodating the shaft 14. Referring simultaneously to FIGS. 2B and 2C, the shaft 14 inserted inside the space 140 extends from the topmost opening of the carrier 160 to the bottommost opening of the carrier 160, passes the region where the valve disc groove 182 connects the shaft seal groove 122, and vertically penetrates the valve disc 18. Referring to FIGS. 2A and 2B, the fluid valve 1 may further include a cap 17 disposed on top of the single shaft-sealing module 16 to cover the topmost opening of the carrier 160 such that the stack of the bushing 61, the plurality of first annular shaft seal rings 162a, the first annular shaft ring 163a, the first annular spring 165, the second annular shaft ring 163b, and the plurality of second annular shaft seal rings 162b are firmly restricted inside the hollow space 1600. The cap 17 is columnar body having a letter L-like shape cross section, a hollow space between an inner wall of the columnar body, and two openings at a topmost end and a bottommost end, respectively. The shaft 14 may pass the hollow space of the cap 17 when the shaft 14 is installed in the space 140. The cap 17 may be further fixed onto the carrier 160 with bolts (such as shown in FIG. 2A) or other means.

Figure 2F:
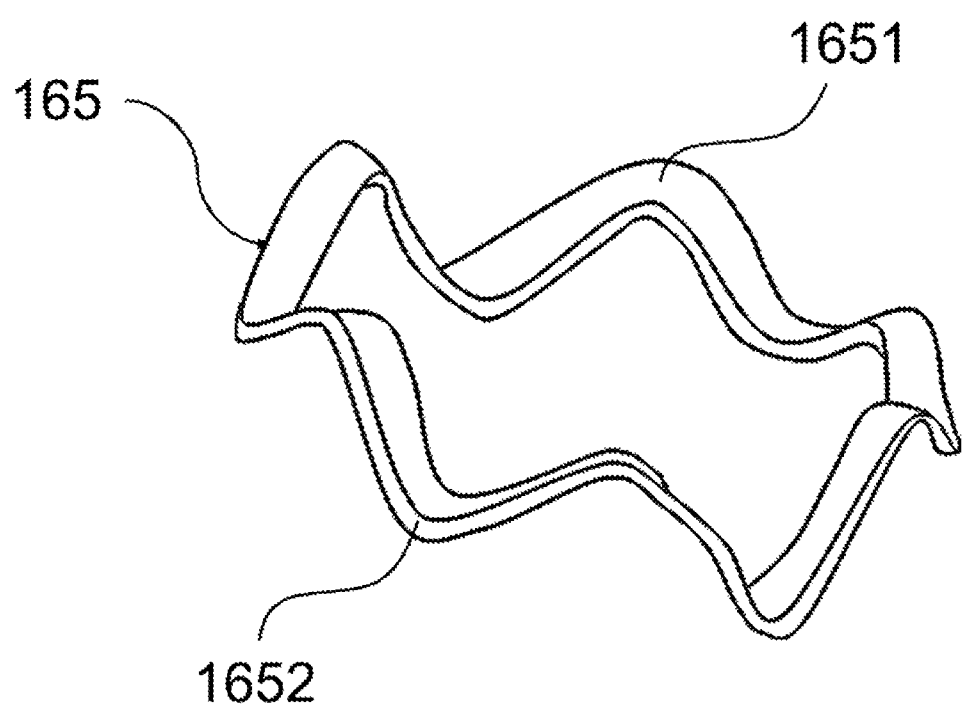
FIG. 2F is a perspective view schematically illustrating the first annular spring of wave type of the single shaft-sealing module in FIG. 2C in accordance with the first embodiment of the present disclosure.

As shown in FIG. 2F, in one embodiment, the first annular spring 165 may be a wave spring formed with a continuously wave-shaped contour and a plurality of convex portions 1651 and a plurality of concave portions 1652 on the same plane. The wave spring may be made of material with rigidity higher than that of the first annular shaft seal rings 162a and the second annular shaft seal rings 162b, such as INCONEL alloy. The convex portions 1651 and the concave portions 1652 are arranged in a naturally offset manner. The convex portions 1651 and the concave portions 1652 are the same in number. At least two convex portions 1651 and two concave portions 1652 are formed on the first annular spring 165. In one embodiment, the convex portions 1651 are four to eight in number. As shown in FIG. 2F, for example, both the convex portions 1651 and the concave portions 1652 are six in number. Referring to FIGS. 2C and 2F, when the first annular spring 165 disposed between the first annular shaft ring 163a and the second annular shaft ring 163b is a wave spring, the convex portions 1651 contact a bottommost surface of the second annular shaft ring 163b while the concave portions 1652 contact a topmost surface of the first annular shaft ring 163a. Since the wave spring is made of higher rigidity material, the convex portions 1651 uniformly distributed the forces generated from the components on top of the convex portions 1651 while the concave portions 1652 uniformed distributed the forces generated from the components below the concave portions 1652. With the wave-shaped contour and the higher rigidity, the first annular spring 165 not only occupies little space in comparison with a typical coil spring but also contributes uniform axial loading distribution and therefore transforms uniform lateral loading distribution in comparison with a typical disc spring. Therefore, an ideal loading distribution on the shaft sealing components surrounding the shaft 14 of the fluid valve 1 can be achieved.

Figure 2G:
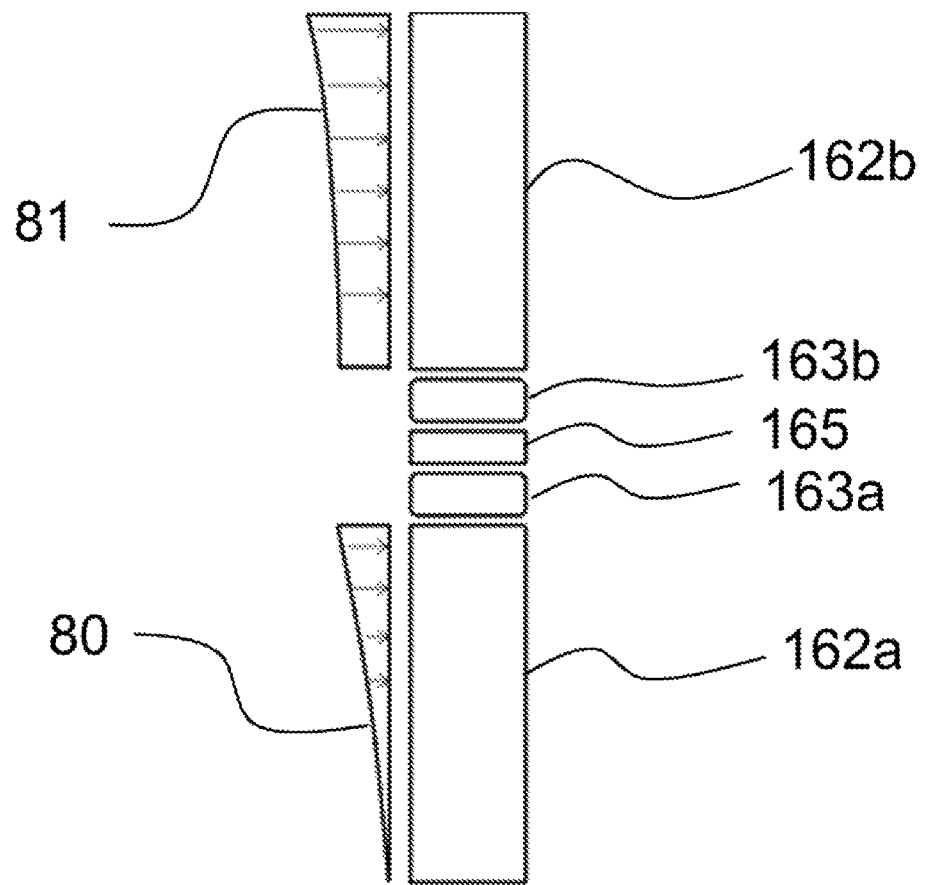
FIG. 2G is a cross-sectional view schematically illustrating the lateral loading distribution on the first and second annular shaft seal rings of the single shaft-sealing module of the fluid valve in accordance with the first embodiment of the present disclosure.

As shown in FIG. 2G, the annular shaft rings 163a and 163b and the first annular spring 165 disposed between the two annular shaft rings 163a and 163b together effectively enables the lateral loading distribution 80 on the plurality of first annular shaft seal rings 162a and the lateral loading distribution 81 on the plurality of second annular shaft seal rings 162b to become closer to each other, especially those parts respectively abutting the annular shaft rings 163a and 163b, and therefore allows the lateral loadings on the topmost end of the first/lower annular shaft seal rings 162a and on the bottommost end of the second/upper annular shaft seal rings 162b to become substantially equal and reduces the lateral loading difference between the first/lower annular shaft seal rings 162a and the second/upper annular shaft seal rings 162b.

Figure 3A:
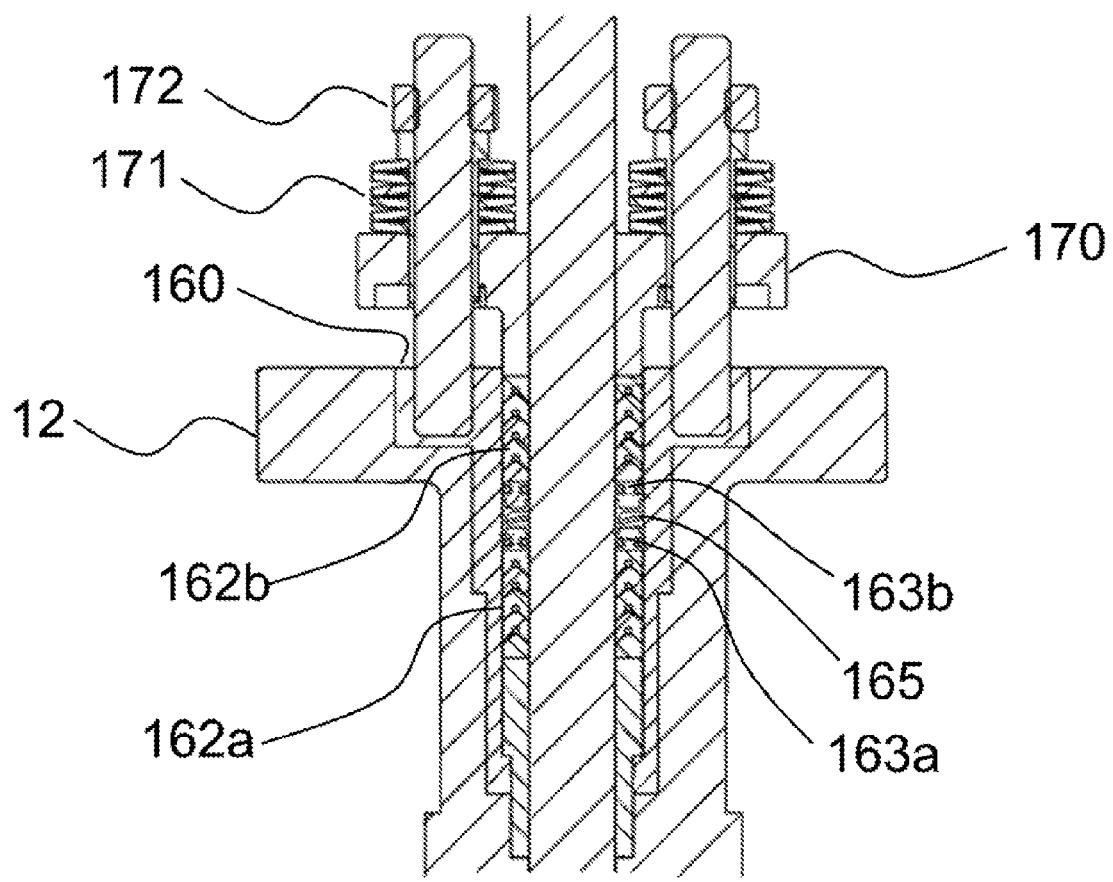
FIG. 3A is a partially enlarged cross-sectional view schematically illustrating another shaft sealing structure of a fluid valve in accordance with a second embodiment of the present disclosure.

As shown in FIG. 3A, in a second embodiment, the fluid valve 1 may further include two sets of springs 171 of disc-shaped washer type with nuts 172 disposed on top of the cap 17 in an axially symmetrical manner to apply more downward forces to the cap 17 and therefore to the stack of the plurality of first annular shaft seal rings 162a, the first annular shaft ring 163a, the first annular spring 165, the second annular shaft ring 163b, and the plurality of second annular shaft seal rings 162b. In this way, all the components in the single shaft-sealing module 16 could be compressed tighter to enable more uniform lateral and axial loading distribution on the plurality of first annular shaft seal rings 162a and the plurality of second annular shaft seal rings 162b. Although the springs 171 of disc-shaped washer type and the nuts 172 are used in this embodiment, the type of the springs 171 and the way to fix the springs 171 are not limited in the present disclosure.

Figure 3B:
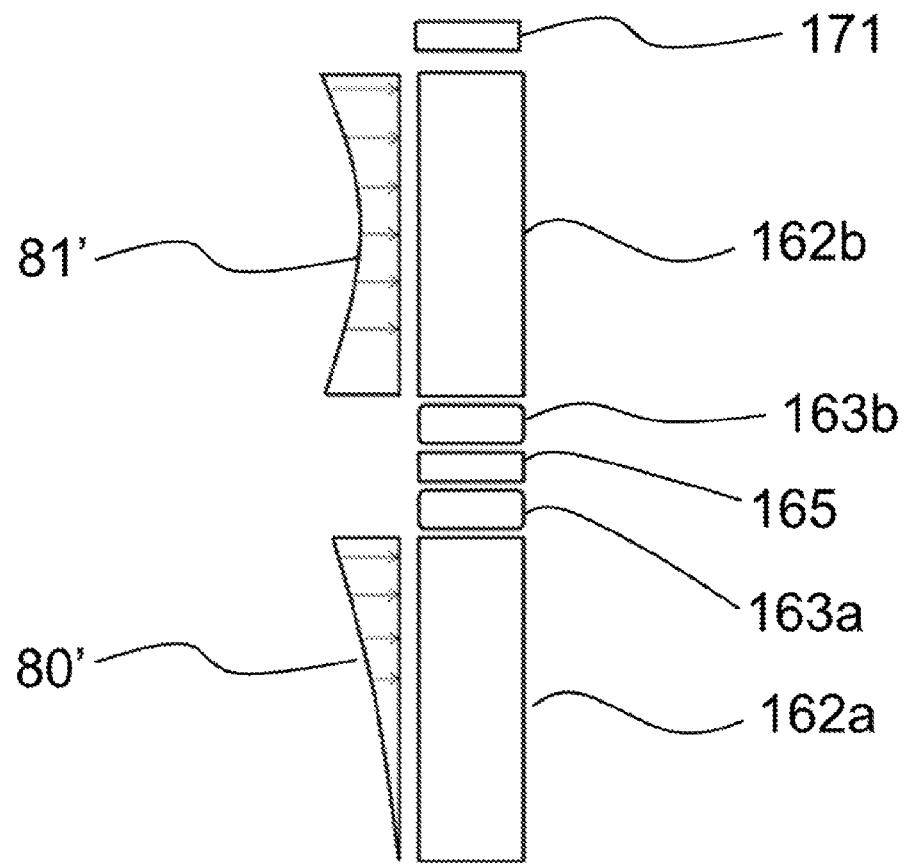
FIG. 3B is a cross-sectional view schematically illustrating the lateral loading distribution on the first and second annular shaft seal rings of the single shaft-sealing module of the fluid valve in FIG. 3A in accordance with the second embodiment of the present disclosure.

As shown in FIG. 3B, the springs 171 and the nuts 172 disposed on top of the cap 17 enable the lateral loading distribution 80' on the plurality of first annular shaft seal rings 162a and the lateral loading distribution 81' on the plurality of second annular shaft seal rings 162b to become further closer to each other, especially those parts respectively abutting the annular shaft rings 163a and 163b, and therefore allows the lateral loadings on the topmost end of the first/lower annular shaft seal rings 162a and on the bottommost end of the second/upper annular shaft seal rings 162b to become substantially equal and reduces the lateral loading difference between the first/lower annular shaft seal rings 162a and the second/upper annular shaft seal rings 162b.

Figure 1A:
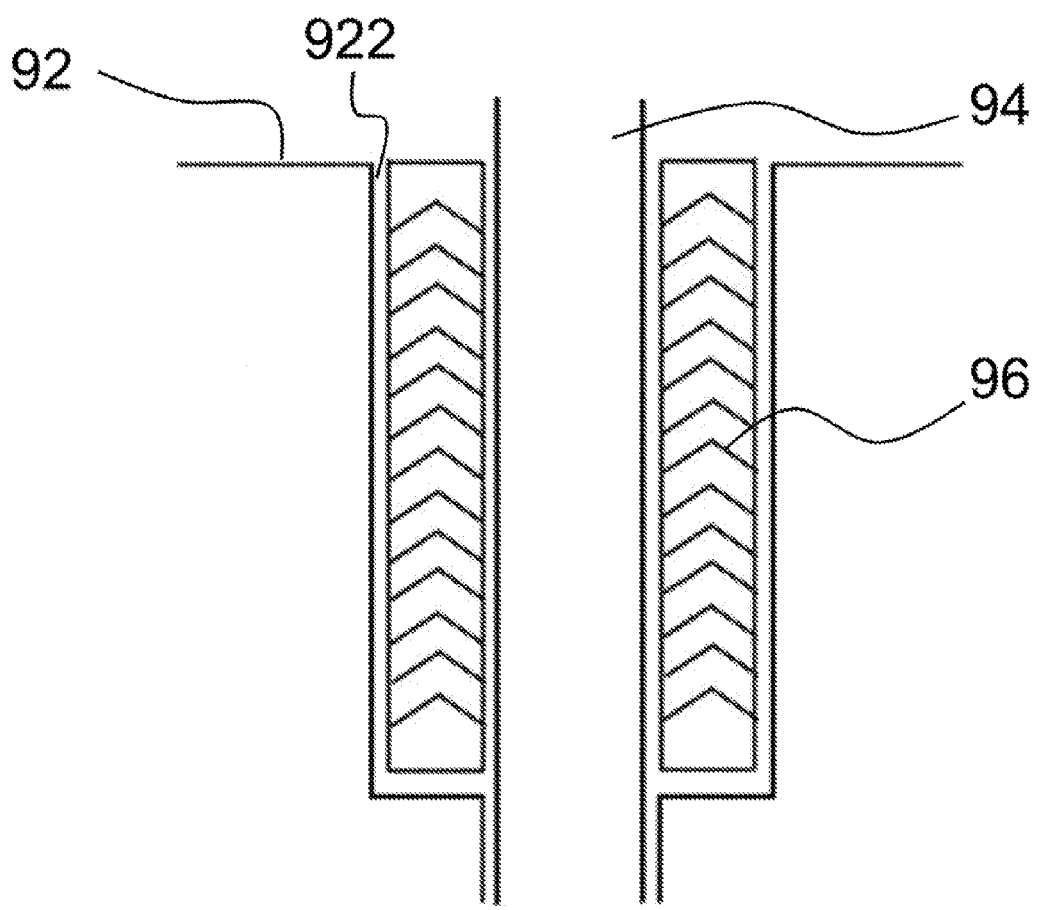
FIG. 1A is a cross-sectional view schematically illustrating a shaft sealing structure of a typical fluid valve.
Figure 1B:
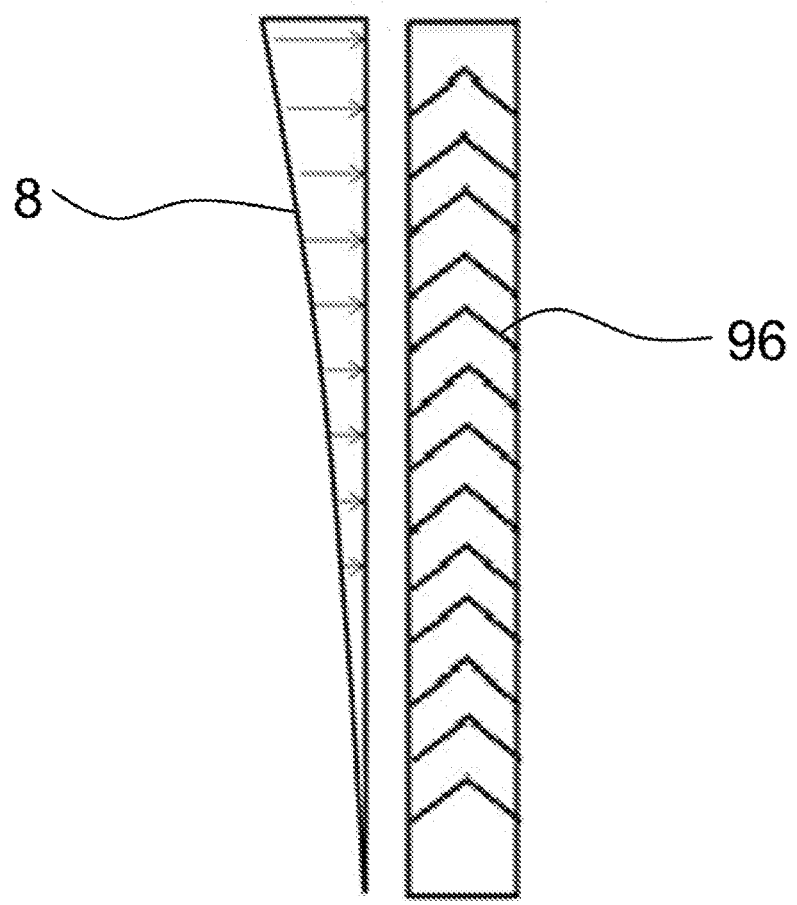
FIG. 1B is a cross-sectional view schematically illustrating the lateral loading distribution on the shaft sealing components of the typical fluid valve.

In comparison with the typical fluid valve having only a plurality of shaft seal rings 96 as shown in FIG. 1A, the present disclosed fluid valve 1 utilizes the additionally provided first annular spring 165 and annular shaft rings 163a and 163b to uniformly distribute the lateral loadings on the annular shaft seal rings that are respectively disposed below bottom of the annular shaft rings 163a and on top of the annular shaft rings 163b. When the annular shaft sealing rings 162a and 162b are worn after being used for a period of time, the first annular spring 165 and the annular shaft rings 163a and 163b and even the above-mentioned springs 171 and the nuts 172 together contribute enough supporting axial forces in the vertical direction to squeeze the annular shaft sealing rings 162a and 162b to slightly deform to prevent gaps being formed between the shaft 14 and the inner surface of the carrier 160. As a result, the effect of balancing the lateral loadings on the annular shaft sealing rings 162a and 162b made of soft non-metal materials could be achieved.

Referring back to FIG. 2B in view of FIG. 2C, the carrier 160 can be entirely removed upward from the shaft seal groove 122 of the valve body 12. Upon removing the carrier 160 upward, the first annular protruding portion 1601 formed at the bottommost end on the inner surface of the carrier 160 supports against the second annular protruding portion 1611 formed at the topmost end on the external side surface of the bushing 161 and therefore the stack of all the components seated on the bushing 161. In other words, all of the plurality of first annular shaft seal rings 162a, the first annular shaft ring 163a, the first annular spring 165, the second annular shaft ring 163b, and the plurality of second annular shaft seal rings 162b which are sequentially stacked on the bushing 161 could be removed out of the seal groove 122 in a single operation at the same time when the carrier 160 is removed out of the seal groove 122. In comparison with the typical fluid valve as shown in FIG. 1A, the present disclosed fluid valve 1 utilizes the carrier 160 and the bushing 161 to integrate all of the shaft seal rings into a single detachable and replaceable module. As a result, it would be very convenient for technicians to perform clean and/or replacement of the shaft seal rings and maintain the normal operation of the fluid valve. In other embodiments, although the single shaft-sealing module 16 may be provided without the first annular shaft rings 163a, the second annular shaft ring 163b, and/or the first annular spring 165, the function of the single detachable and replaceable module still performs as long as the carrier 160 and the bushing 161 are utilized.

Figure 4A:
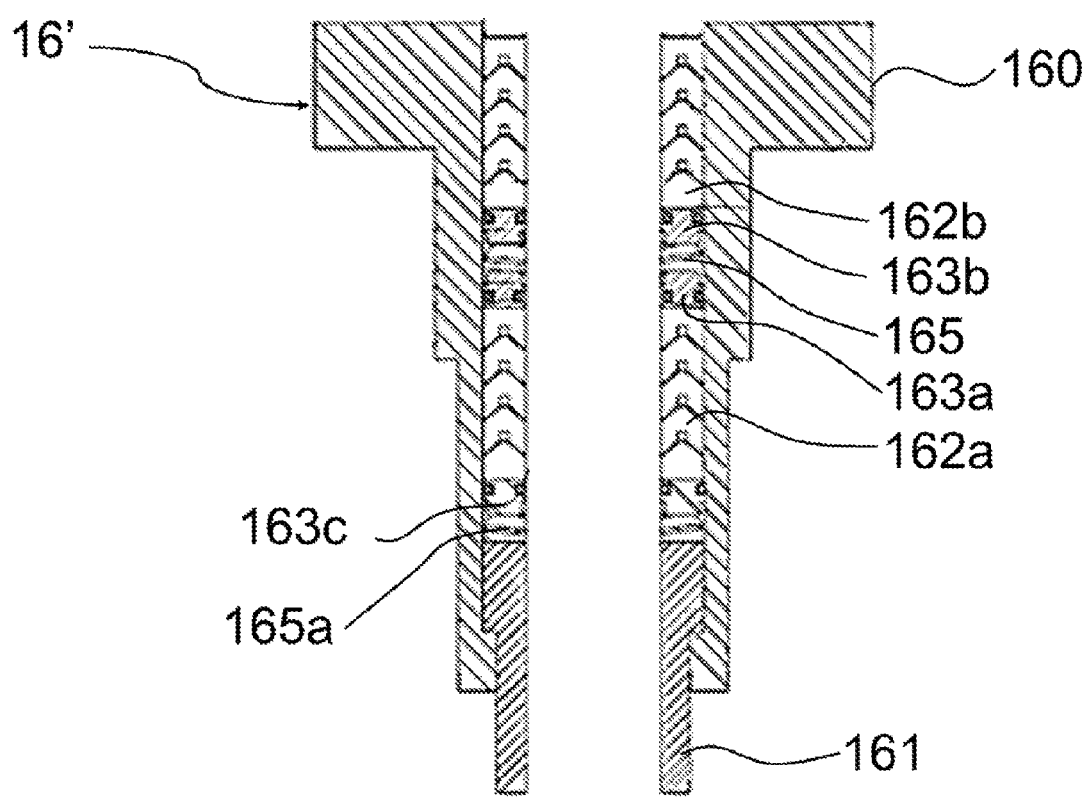
FIG. 4A is a partially enlarged cross-sectional view schematically illustrating another single shaft-sealing module of a still another shaft sealing structure of a fluid valve in accordance with a third embodiment of the present disclosure.
Figure 4B:
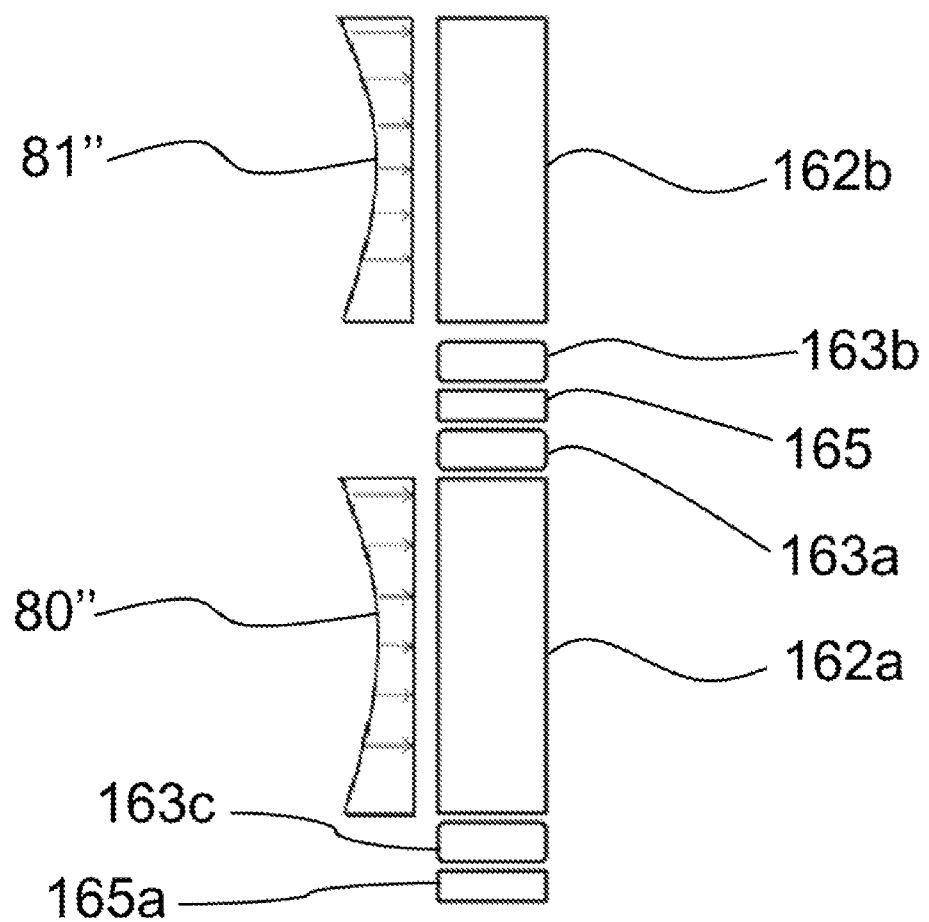
FIG. 4B is a cross-sectional view schematically illustrating the lateral loading distribution on the first and second annular shaft seal rings of the single shaft-sealing module of the fluid valve in FIG. 4A in accordance with the third embodiment of the present disclosure.

Referring to FIG. 4A, in a third embodiment, the fluid valve 1 may further include a third annular shaft ring 163c and a second annular wave spring 165a to form an another single shaft-sealing module 16'. The third annular shaft ring 163c is structurally the same as the first shaft ring 163a and the second shaft rings 163b, and the second annular wave spring 165a is structurally the same as the first annular spring 165 of wave spring type. In this embodiment, all the other components of the single shaft-sealing module 16' including the carrier 160, the bushing 161, the plurality of first annular shaft seal rings 162a, the first annular shaft ring 163a, the first annular spring 165, the second annular shaft ring 163b, and the plurality of second annular shaft seal rings 162b are the same as that included in the single shaft-sealing module 16 in the first embodiment of the present disclosure. The third annular shaft ring 163c and the second annular wave spring 165a are together disposed between the bottommost end of the plurality of first annular shaft seal rings 162a and the topmost end of the bushing 161. The third annular shaft ring 163c abuts onto the bottommost end of the plurality of first annular shaft seal rings 162a while the second annular wave spring 165a abuts onto to the topmost end of the bushing 161. As a result, as shown in FIG. 4B, the third annular shaft ring 163c and the second annular wave spring 165a enable the lateral loading distribution 80" on the plurality of first annular shaft seal rings 162a to become even further closer to the lateral loading distribution 81" on the plurality of second annular shaft seal rings 162b, and therefore allows the lateral loadings on the topmost end of the first/lower annular shaft seal rings 162a and on the bottommost end of the second/upper annular shaft seal rings 162b to become substantially equal and further reduces the lateral loading difference between the lower annular shaft seal rings 162a and the upper annular shaft seal rings 162b. This result helps to extend the life of the annular shaft seal rings 162a and the annular shaft seal rings 162b to be substantially equal.

Similarly, in the third embodiment, all of the plurality of first annular shaft seal rings 162a, the first annular shaft ring 163a, the first annular spring 165, the second annular shaft ring 163b, the plurality of second annular shaft seal rings 162b, the third annular shaft ring 163c, and the second annular spring 165 which are sequentially stacked on the bushing 161 could be removed out of the seal groove 122 in a single operation at the same time when the carrier 160 is removed out of the seal groove 122. As a result, it would be very convenient for technicians to perform clean and/or replacement of the shaft seal rings and maintain the normal operation of the fluid valve, and the time for maintenance could be reduced. Especially, the carrier 160 is reusable regardless of the components carried therein are removed or replaced, and thus is friendly to environment.

In the present disclosure, the disclosed single shaft-sealing module 16 and/or 16' could be used in any type of fluid valve including but not being limited to a globe valve, a ball valve, a butterfly valve, and any other valves used for fluids, although the fluid valve 1 exemplarily shown in the present disclosure is a butterfly valve.

The above-mentioned are merely preferred embodiments of the present disclosure, and shall not be used to limit the scope of the appended claims. Further, those skilled in the art will understand from the description set forth, and practice the present disclosure according thereto. Thus, other equivalent alterations and modifications which are completed without departing from the spirit disclosed by the present disclosure should be included in the scope of the appended claims.

What is claimed is:

1. A fluid valve comprising a valve body, a shaft, and a valve disc, the valve body having a first hollow space to accommodate the shaft and a second hollow space to accommodate the valve disc, the second hollow space being located below the first hollow space and in communication with the first hollow space, the shaft vertically penetrating the valve disc to drive the valve disc to rotate, wherein the fluid valve further comprises:

a single shaft-sealing module entirely disposed inside the first hollow space to surround the shaft, comprising:
  a carrier being a first columnar body formed with a third hollow space between an inner wall of the first columnar body, one opening at a topmost end of the first columnar body and one opening at a bottommost end of the first columnar body, the inner wall of the first columnar body being formed with a first annular protruding portion at the bottommost end of the first columnar body, the carrier being detachable with respect to the valve body and entirely disposed inside the first hollow space to surround the shaft;
  a bushing being a second columnar body formed with a second annular protruding portion at a topmost end of an external side surface of the second columnar body, disposed inside the third hollow space of the carrier at a bottom with the second annular protruding portion being seated on the first annular protruding portion, a bottommost end of the second columnar body extending beyond the bottommost end of the first columnar body of the carrier;
  a plurality of first annular shaft seal rings being non-metal and seated on the topmost end of the second columnar body of the bushing to seal the shaft;
  a first annular shaft ring being metallic and seated on the plurality of first annular shaft seal rings;
  a first annular wave spring being metallic and seated on the first annular shaft ring;
  a second annular shaft ring being metallic and seated on the first annular wave spring; and
  a plurality of second annular shaft seal rings being non-metal and seated on the second annular shaft ring;
wherein the first hollow space is columnar and gradually narrowed from a topmost end of the first hollow space; the topmost end of the first columnar body of the carrier is beneath the topmost end of the first hollow space; the first annular wave spring is formed with a continuously wave-shaped contour and a plurality of convex portions and a plurality of concave portions on a same plane in an offset manner, the convex portions and the concave portions have a same number in quantity, and the convex portions contact a bottommost surface of the second annular shaft ring while the concave portions contact a topmost surface of the first annular shaft ring; all of the bushing, the plurality of first annular shaft seal rings, the first annular shaft ring, the first annular wave spring, the second annular shaft ring, and the plurality of second annular shaft seal rings together surround a space to accommodate the shaft; at least the plurality of first annular shaft seal rings and the plurality of second annular shaft seal rings provide sealing between the shaft and the inner wall of the first columnar body of the carrier; and a lateral loading on a topmost end of the plurality of first annular shaft seal rings and a lateral loading on a bottommost end of the plurality of second annular shaft seal rings are substantially equal.

2. The fluid valve of claim 1, wherein the fluid valve further comprises an annular cap disposed on top of the single shaft-sealing module to cover the topmost end opening of the first columnar body of the carrier to restrict the bushing, the plurality of first annular shaft seal rings, the first annular shaft ring, the first annular wave spring, the second annular shaft ring, and the plurality of second annular shaft seal rings inside the carrier, and, wherein the shaft penetrates the annular cap.

3. The fluid valve of claim 2, wherein the fluid valve further comprises two sets of springs disposed on top of the annular cap in an axially symmetrical manner.

4. The fluid valve of claim 3, wherein the two sets of springs are disc-shaped.

5. The fluid valve of claim 1, wherein one of the first annular shaft ring and the second annular shaft ring provides sealing between the shaft and the inner wall of the first columnar body of the carrier.

6. The fluid valve of claim 5, wherein an inner surface of one of the first annular shaft ring and the second annular shaft ring is formed with a first annular groove, and an outer surface of one of the first annular shaft ring and the second annular shaft ring is formed with a second annular groove, and the first annular groove, and the second annular groove each is embedded with an O-ring.

7. The fluid valve of claim 5, wherein one of the first annular shaft ring and the second annular shaft ring is formed with a protrusion at a central part of a bottommost end and two shoulders at two side edges of a bottommost end, respectively.

8. The fluid valve of claim 1, wherein the carrier has an L shape cross section.

9. The fluid valve of claim 1, wherein the bushing and the carrier are one-piece made of metallic materials.

10. The fluid valve of claim 1, wherein an inner surface of the valve body surrounding the first hollow space is formed with a plurality of shoulders to fit a shape of the single shaft-sealing module, and at least one of the shoulders near a region where the second hollow space in communication with the first hollow space is provided with a seal ring to avoid fluid leakage between the single shaft-sealing module and the valve body.

11. The fluid valve of claim 1, wherein the convex portions and the concave portions are four to eight in number.

12. The fluid valve of claim 1, the plurality of first annular shaft seal rings, the first annular shaft ring, the first annular wave spring, the second annular shaft ring, and the plurality of second annular shaft seal ring have a same inner diameter.

13. The fluid valve of claim 1, wherein a ratio of a height of the bushing to a height of all the plurality of first annular shaft seal rings, the first annular shaft ring, the first annular wave spring, the second annular shaft ring, and the plurality of second annular shaft seal rings ranges from 1:2.5 to 1:3.5.

14. The fluid valve of claim 13, wherein a ratio of the height of the bushing to a height of the carrier ranges from 1:3 to 1:4.

15. The fluid valve of claim 1, wherein the fluid valve is a valve selected from a group consisting of a globe valve, a ball valve, and a butterfly valve.

16. The fluid valve of claim 1, wherein the first annular shaft seal rings and the second annular shaft seal rings are made of soft non-metal materials while the first annular shaft ring, the second annular shaft ring, and the first annular spring are made of metallic materials.

17. The fluid valve of claim 16, wherein the soft non-metal materials include graphite and PTFE.

18. The fluid valve of claim 16, wherein the first annular shaft ring and the second annular shaft ring are made of stainless steel, and the first annular spring is made of alloy.

19. The fluid valve of claim 16, wherein the first annular shaft ring and the second annular shaft ring are made of SAE 304 stainless steel.

20. The fluid valve of claim 16, wherein the first annular spring is made of INCONEL alloy.

* * * * *